H. S. Z. ADLER.
ROBE FOR AUTOMOBILES.
APPLICATION FILED SEPT. 23, 1915.

1,208,440.

Patented Dec. 12, 1916.

WITNESSES
Frank C. Palmer.

INVENTOR
Herman S. Z. Adler
BY
ATTORNEYS

UNITED STATES PATENT OFFICE.

HERMAN S. Z. ADLER, OF NEW YORK, N. Y.

ROBE FOR AUTOMOBILES.

1,208,440.  Specification of Letters Patent.  Patented Dec. 12, 1916.

Application filed September 23, 1915. Serial No. 52,181.

*To all whom it may concern:*

Be it known that I, HERMAN S. Z. ADLER, a citizen of the United States, and a resident of the city of New York, borough of Manhattan, in the county and State of New York, have invented a new and Improved Robe for Automobiles, of which the following is a full, clear, and exact description.

The invention relates to robes for automobiles such as shown and described in my Patent No. 1,164,445, dated Dec. 14, 1915.

The object of the present invention is to provide a new and improved robe arranged to permit convenient attachment to automobiles and similar vehicles of different makes and different width of the body and that of the wind shield.

In order to accomplish the desired result, use is made of a robe shaped to extend across the open top of an automobile body from the dashboard or wind shield to the front seat and from one side to the other side thereof, buckle straps attached to the front end of the robe and adapted to be passed around the wind shield, and fastening means on the sides of the robe near the rear end thereof for engagement with buttons at the sides of the automobile to hold the robe stretched across the open top of the automobile body.

A practical embodiment of the invention is represented in the accompanying drawings forming a part of this specification in which similar characters of reference indicate corresponding parts in both views.

Figure 1:
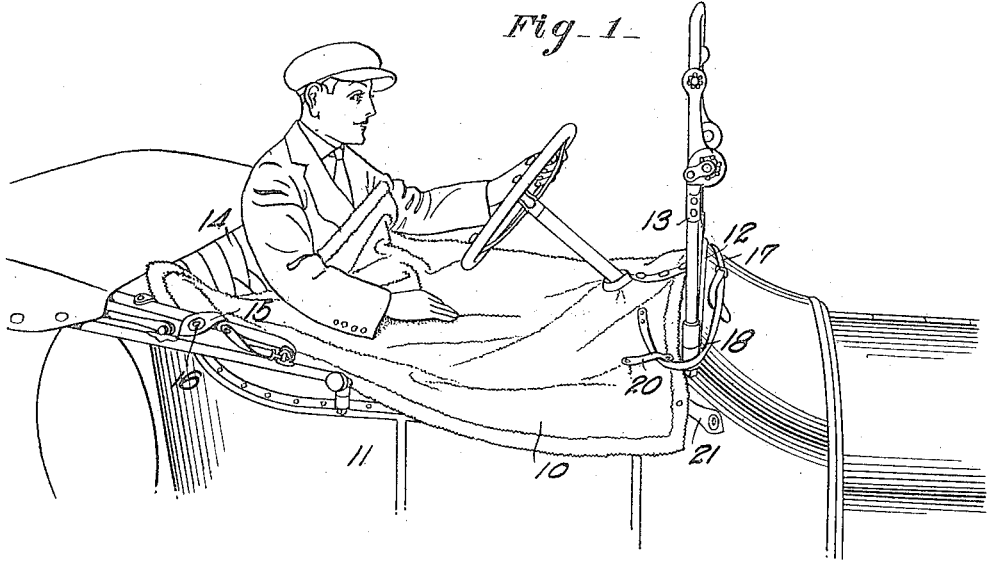
Figure 2:
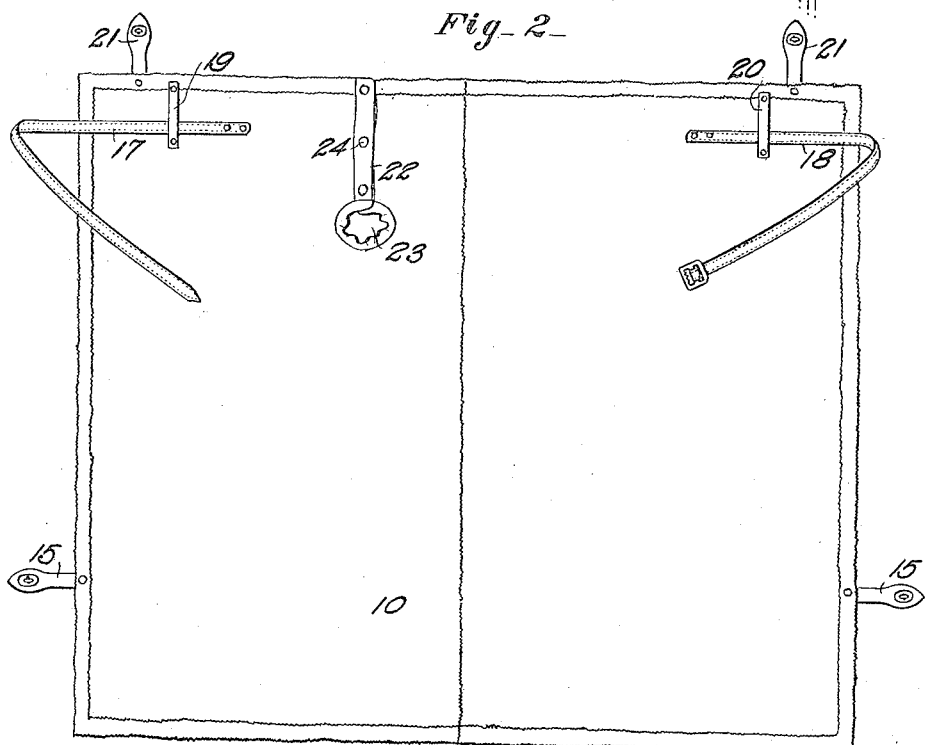

Figure 1 is a perspective view of the robe as applied; and Fig. 2 is a plan view of the robe.

The robe 10 of a suitable material is shaped to extend across the open top of an automobile body 11 from the dashboard 12 and wind shield 13 to the front seat 14 and from one side of the automobile body 11 to the other side thereof, as plainly indicated in Fig. 1. The body of the robe 10 is provided at the sides near the rear end with tabs 15 extending outwardly and adapted to be passed over the sides of the front seat 14 to engage the curtain fasteners 16 held on the side arms of the folding top of the automobile, it being understood that each curtain fastener 16 is in the form of a turnable button adapted to engage a gromet on the corresponding tab 15. The front end of the robe body 10 is provided with buckle straps 17 and 18 adapted to be passed around the wind shield 13 directly above the dashboard 12, the terminals of the tabs 17 and 18 being buckled together in front of the wind shield, as plainly indicated in Fig. 1, so as to support the front end of the robe body 10. In case of extra wide automobile bodies 11 and wind shields 13, use is made of loops 20 extending longitudinally of the robe body 10 and fastened to the latter intermediate the side edges of the robe body and the attached ends of the straps 17 and 18. The straps 17 and 18 after being passed through the loops 19 and 20 are passed around the wind shield 13 to be fastened together at the front thereof, the same as above explained in reference to wind shields of less width. The front end of the robe body is provided with tabs 21 adapted to be engaged with curtain fasteners arranged on the front of the dashboard 12, it being understood that the curtain fasteners are similar in construction to the curtain fasteners 16 above mentioned. In case the buttons for the tabs 21 are not on the automobile body then the tabs 21 simply hang loosely down from the robe body and the front end of the latter is supported wholly by the buckle straps 17, 18, as previously explained.

The front portion of the body of the robe 10 is provided with a slit 22 extending from the front edge of the robe 10 rearward a short distance to terminate in an opening 23 for the passage of the steering post, as plainly indicated in Fig. 1.

When placing the robe in position on the automobile the buckle straps 17 and 18 are passed around the wind shield 13 or the dashboard 12 and the steering post is passed through the slit 22 to extend through the opening 23, after which the overlapping flaps of the slit 22 are fastened together by suitable buttons or other fastening devices 24. The rear tabs 15 are engaged with the buttons 16.

It is understood that the body 10 is sufficiently large to form a lap robe for the occupants of the front seat to protect the same against the inclemency of the weather and at the same time the legs of the driver are completely unobstructed to permit the driver to readily manipulate the pedal in the usual manner. It will also be noticed that the driver has his hands completely free for manipulating the steering wheel or to allow the driver to reach under the robe for manipulating any one of the lights or other devices in the front of the automobile body 11.

By locating the straps 15 at the sides near the rear end of the robe 10 the driver needs only to detach a tab 15 of the robe 10 from its fastening 16 whenever he desires to alight from the automobile body 11. The corresponding rear corner of the robe can be readily folded back to allow opening of the door for the ingress or egress of another person.

Having thus described my invention, I claim as new and desire to secure by Letters Patent:

As an article of manufacture, an automobile robe having a rectangular body of a size to extend across the open top of an automobile body from the dashboard to the front seat and from one side to the other side thereof, the front portion of the robe body having a slit leading to an opening for the passage of the steering post of the automobile, straps secured to one face of the robe body adjacent the front edge and a distance from the side edges, one of the straps being provided with a buckle, the said straps being adapted to be passed around the front of the wind shield of the automobile and buckled together to support the front end of the robe, loops attached to the robe body at points intermediate the sides of the robe body and the attached ends of the said straps for the latter to pass through the loops, the robe body being provided at the rear of its sides with projecting tabs adapted to extend over the side edges of the automobile body to engage with the curtain fastener buttons on the sides of the automobile body to support the rear end of the robe, and tabs on the front end of the said robe body adjacent the sides thereof and adapted to engage the curtain fastener buttons at the front of the dashboard of the automobile.

In testimony whereof I have signed my name to this specification in the presence of two subscribing witnesses.

HERMAN S. Z. ADLER.

Witnesses:
THEO. G. HOSTER,
PHILIP D. ROLLHAUS.

Copies of this patent may be obtained for five cents each, by addressing the "Commissioner of Patents, Washington, D. C."